US009977207B2

(12) United States Patent
Bringuier et al.

(10) Patent No.: US 9,977,207 B2
(45) Date of Patent: May 22, 2018

(54) OPTICAL FIBER CABLE WITH BONDED CORE ELEMENTS

(71) Applicant: Corning Optical Communications LLC, Hickory, NC (US)

(72) Inventors: Anne Germaine Bringuier, Taylorsville, NC (US); Joel Patrick Carberry, Big Flats, NY (US); David Wesley Chiasson, Edmonton (CA); Anping Liu, Horseheads, NY (US); Barada Kanta Nayak, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days. days.

(21) Appl. No.: 15/168,545

(22) Filed: May 31, 2016

(65) Prior Publication Data

US 2016/0356974 A1   Dec. 8, 2016

Related U.S. Application Data

(60) Provisional application No. 62/170,233, filed on Jun. 3, 2015.

(51) Int. Cl.
  *G02B 6/44*   (2006.01)
(52) U.S. Cl.
  CPC ......... *G02B 6/4405* (2013.01); *G02B 6/4413* (2013.01); *G02B 6/4434* (2013.01)
(58) Field of Classification Search
  CPC .. G02B 6/4405; G02B 6/4413; G02B 6/4434; G02B 6/4429; G02B 6/4401

USPC ......... 385/130, 110, 113, 114, 147
See application file for complete search history.

(56) References Cited

U.S. PATENT DOCUMENTS

| | | | |
|---|---|---|---|
| 5,694,510 A | 12/1997 | Sano et al. | |
| 5,703,983 A * | 12/1997 | Beasley, Jr. ............ | G02B 6/449 385/103 |
| 5,809,194 A * | 9/1998 | Lovie ................... | G02B 6/4407 347/4 |
| 5,905,834 A * | 5/1999 | Anderson .............. | G02B 6/441 385/111 |
| 6,314,713 B1 * | 11/2001 | Fitz ....................... | G02B 6/449 385/147 |

(Continued)

FOREIGN PATENT DOCUMENTS

| | | |
|---|---|---|
| DE | 3637205 A1 | 5/1988 |
| EP | 2163927 B1 | 4/2013 |

(Continued)

OTHER PUBLICATIONS

International Search Report and Written Opinion PCT/US2016/034930 dated Aug. 9, 2014.

*Primary Examiner* — Ellen Kim
(74) *Attorney, Agent, or Firm* — William D. Doyle

(57) ABSTRACT

An optical communication cable and related systems and methods are provided. The optical cable includes a plurality of wrapped core elements, and the outer surfaces of adjacent wrapped core elements are joined together by discrete bond sections. The discrete bonds sections may be structures such as laser welds, ultrasonic welds, or adhesive material. The discrete bonds hold the wrapped core elements together in the wrapped pattern, such as an SZ stranding pattern.

9 Claims, 4 Drawing Sheets

(56) References Cited

U.S. PATENT DOCUMENTS

| | | | | |
|---|---|---|---|---|
| 6,318,061 B1 * | 11/2001 | Schneider | ........... | B29C 47/0016 57/13 |
| 6,529,662 B1 * | 3/2003 | Kobayashi | ........... | G02B 6/4432 385/112 |
| 7,200,307 B2 | 4/2007 | Bau' et al. | | |
| 7,203,405 B1 * | 4/2007 | Storaasli | ................ | G02B 6/443 385/109 |
| 7,321,709 B2 * | 1/2008 | Yokokawa | ........... | G02B 6/4434 385/100 |
| 2011/0110635 A1 * | 5/2011 | Toge | .................... | G02B 6/4403 385/102 |
| 2014/0369656 A1 | 12/2014 | Gimblet et al. | | |

FOREIGN PATENT DOCUMENTS

| | | |
|---|---|---|
| EP | 2977804 A1 | 1/2016 |
| JP | 2009294322 A | 12/2009 |

* cited by examiner

OPTICAL FIBER CABLE WITH BONDED CORE ELEMENTS

CROSS-REFERENCE TO RELATED APPLICATIONS

This application claims the benefit of priority to U.S. Provisional Application No. 62/170,233, filed on Jun. 3, 2015, which is incorporated herein by reference.

BACKGROUND

The disclosure relates generally to optical communication cables and more particularly to optical communication cables including stranded core elements that are bonded or adhered to an adjacent core element. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the disclosure relates to an optical communication cable. The optical communication cable includes a cable body including an inner surface defining a passage in the body, a first core element located in the cable body and a second core element located in the cable body. The first core element includes a first tube having an inner surface defining a bore, an outer surface and a first optical transmission element located within the bore of the first tube. The second core element includes a second tube having an inner surface defining a bore, an outer surface and a second optical transmission element located within the bore of the second tube. The first core element and the second core element are wound around a central area of the passage such that the first and second core elements are adjacent to each other defining an interface between the outer surfaces of the first and second tubes that, wherein the interface extends at least a portion of a length of the cable body. The cable includes a plurality of discrete bonded sections joining the outer surface of the first tube to the outer surface of the second tube at discrete sections along the length of the interface such that the first tube and the second tube are held relative to each other following winding. The cable includes unbonded sections of the outer surface of the first tube and of the outer surface of the second tube that are located between adjacent bonded sections along the length of the interface.

An additional embodiment of the disclosure relates to a core for an optical communication cable. The core includes a plurality of elongate core elements wrapped around each other such that a portion of a length of the plurality of wrapped elongate core elements forms a spiral portion around a central area surrounded by the plurality of core elements in a circumferential direction when viewed in cross-section. An outer surface of each core element is adjacent to an outer surface of one of the other core elements in the clockwise direction and is adjacent to an outer surface of one of the other core elements in the counterclockwise direction. The core includes a plurality of bonds between the outer surface of each core element and the outer surface of the core element adjacent in the clockwise direction and between the outer surface of each core element and the outer surface of the core element adjacent in the counterclockwise direction.

An additional embodiment of the disclosure relates to a method of forming a core for an optical communication cable. The method includes providing a plurality of elongate optical core elements each having an outer surface. The method includes wrapping the plurality of elongate optical core elements around each other such that a portion of a length of the plurality of wrapped elongate core elements forms a spiral portion around a central area surrounded by the plurality of core elements in the circumferential direction when viewed in cross-section. An outer surface of each core element is adjacent to the outer surface of one of the other core elements in the clockwise direction and is adjacent to the outer surface of one of the other core elements in the counterclockwise direction. The method includes bonding a subsection of the outer surface of a first core element of the plurality of core elements to a subsection of the outer surface of a second of the plurality of core elements where the second core element is adjacent to the first core element in the clockwise direction when viewed in cross-section. The method includes bonding another subsection of the outer surface of the first core element to a subsection of the outer surface of a third of the plurality of core elements where the third core element is adjacent to the first core element in the counterclockwise direction when viewed in cross-section.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Figure 1:
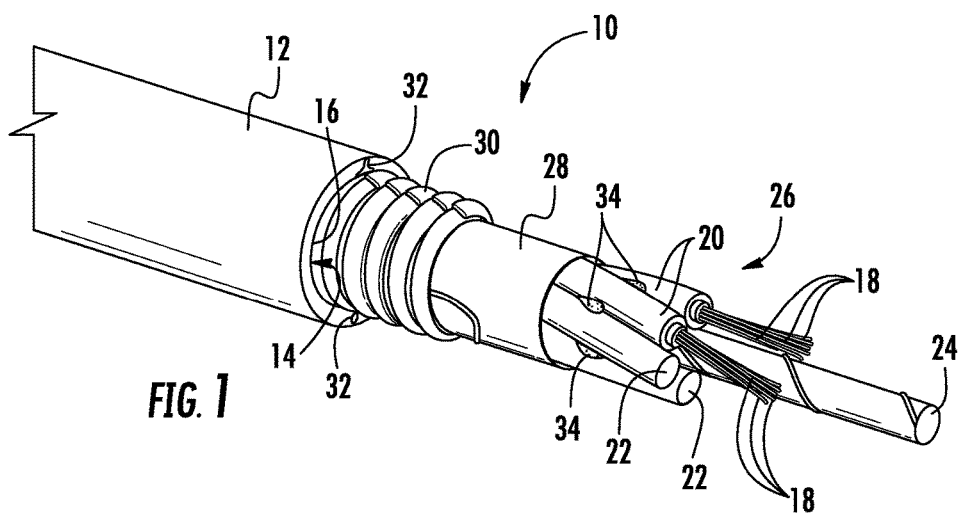
FIG. 1 is a perspective view of an optical communication cable according to an exemplary embodiment.

Referring generally to the figures, various embodiments of an optical communication cable (e.g., a fiber optic cable, an optical fiber cable, etc.), a core for an optical communication cable and formation methods and systems are shown. In general, the embodiments discussed herein relate to an optical core including a plurality of elongated optical core elements (e.g., buffer tubes containing loose optical fibers, tight buffered optical fibers, filler rods, filler tubes, etc.). The optical core elements are wrapped around each other forming a wrapped pattern (e.g., an SZ stranding pattern). Each optical core element is bonded to at least one adjacent core element by a plurality of discrete bonded sections joining the outer surfaces of adjacent core elements to each other. Each pair of bonded core elements includes multiple discrete bonded segments extending along the longitudinal length of the interface between the adjacent core elements and also includes multiple unbonded sections spaced between the discrete bonded segments.

In various embodiments, by utilizing intermittent bonding between adjacent core elements, a stable optical core that maintains the desired wrapped pattern can be created without the need for an external radial binding element, such as a helical binder or a binding sleeve. Further, by controlling the degree of bonding within each bonded segment and by controlling the spacing of each bonded segment along the length of the core elements, the amount of force needed to access and separate a particular core element from the rest of the optical core can be controlled. In various embodiments, elimination of the external radial binding element improves the accessibility of the core elements of the optical cable by eliminating a layer that must be breached and removed prior to accessing the core elements.

In addition, the bonding arrangement discussed herein allows a single core element to be accessed and split from the rest of the core elements while leaving the bonded sections between the non-accessed core elements in place. This is in contrast to the typical radial force binder which, once breached, ceases applying binding force to other the core elements. Further, the direct bonding between adjacent core elements forms a stable SZ stranded core without the need for a rigid central strength member typically needed to support an SZ stranded core that utilizes radially restrictive binders. Further, in at least some embodiments, the core element bonding arrangement discussed herein provides an optical core with more accessible interstitial regions which may facilitate permeation of various materials (e.g., water-blocking SAP powders, gels, etc.) into the stranded optical core. In addition, in embodiments in which the core elements contact each other and completely surround a central area, the optical core has improved crush resistance and improved stability that results from the direct bonding between adjacent core elements rather than simply relying on the radial force of the external binder and friction between adjacent core element and the strength element.

Further, the core stability provided by the direct core element bonding discussed herein is believed to provide a number of advantages during optical core and cable manufacturing. For example, because the discrete bonding between core elements can be formed directly after stranding, the bonds act to hold the stranded pattern in place as downstream processes (e.g., jacketing, armor formation, etc.) take place. This bonding may produce an optical core with reduced lay-length variability by reducing relative movement between core elements during cable formation. It is believed that the optical core utilizing the discrete bonding discussed herein is less susceptible to deformation that may otherwise be caused by the heat of the jacket extrusion process. The process of forming discrete bonding discussed herein improves manufacturability by allowing the production line to be stopped and started without adversely affecting thermoplastic core elements (e.g., buffer tubes, filler rods, etc.). The process of forming discrete bonding discussed herein improves manufacturability by allowing re-jacketing in the event of defects in the jacketing process. In addition, the discrete bonding provides the ability to provide for colored weld or adhesion material that allows for creating a color based ID on the core element at the time of stranding and bonding, rather than relying on preformed buffer tubes of a certain color for ID purposes.

Referring to FIG. 1, an optical communication cable, shown as cable 10, is shown according to an exemplary embodiment. Cable 10 includes a cable body, shown as cable jacket 12, having an inner surface 14 that defines an inner channel, passage or cavity, shown as central bore 16. As will be generally understood, inner surface 14 of jacket 12 defines an internal area or region within which the various cable components discussed below are located. A plurality of optical transmission elements, shown as optical fibers 18, are located within bore 16. Generally, cable 10 provides structure and protection to optical fibers 18 during and after installation (e.g., protection during handling, protection from elements, protection from vermin, etc.).

Figure 2:
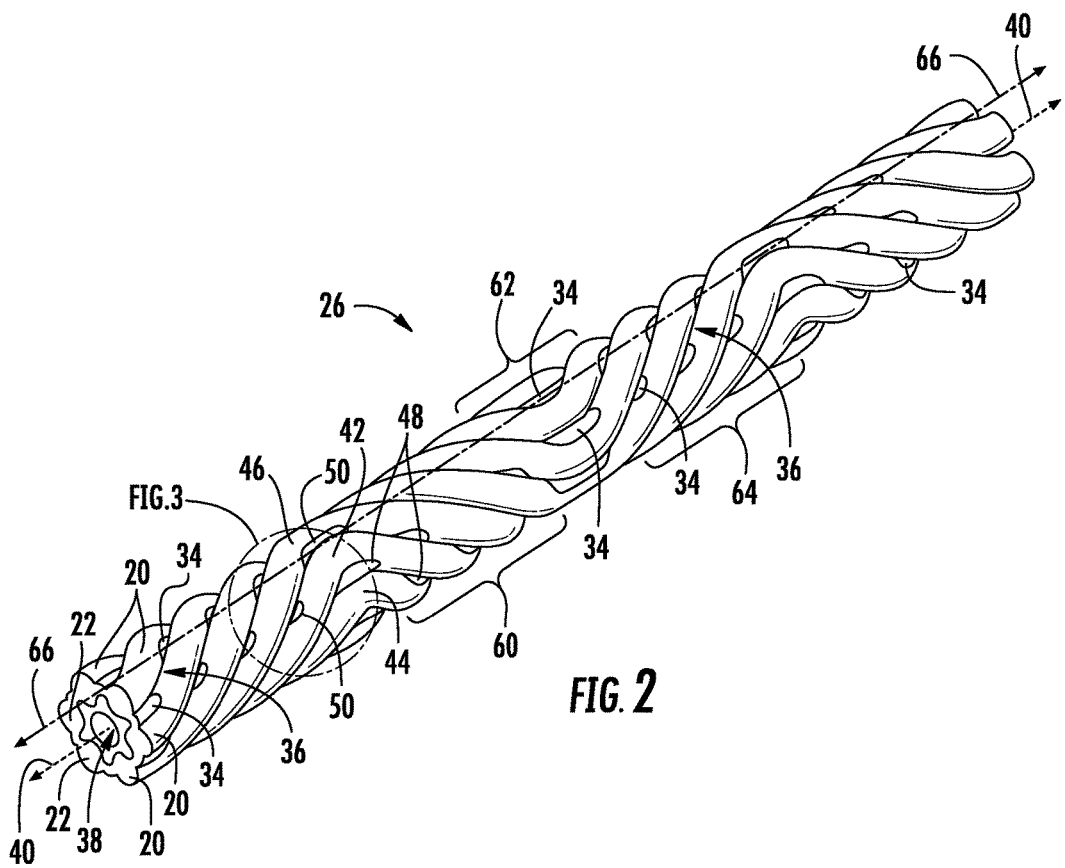
FIG. 2 is a perspective view of an optical core according to an exemplary embodiment.

In the embodiment shown in FIG. 1, cable 10 includes a plurality of core elements located within central bore 16. A first type of core element is an optical transmission core element, and, in the embodiment of FIG. 1, the core elements include one or more optical fiber 18 that are located within tubes, such as buffer tubes 20. One or more additional core elements, shown as filler rods 22, may also be located within bore 16. In the embodiment shown, filler rods 22 and buffer tubes 20 are arranged or wrapped around a central support, shown as central strength member 24 formed from a material such as glass-reinforced plastic or metal (e.g., steel). Together, buffer tubes 20 containing optical fibers 18, filler rods 22 and central strength member 24 form the core 26 of cable 10. In various embodiments, core 26 may include any type of optical core element in any combination including optical micro-modules, tight buffered optical fibers, and filler tubes. In other embodiments (e.g., as shown in FIG. 2 below), optical core 26 does not include a central strength member, and optical core 26 includes a series of bonded sections that that support optical core in the desired wrapped pattern.

In various embodiments such as shown in FIG. 1, cable 10 may include a variety of additional layers or structures located within jacket bore 16 between core 26 and inner surface 14. For example, a water blocking material, such as water barrier tape 28, may be located around the wrapped buffer tubes 20 and filler rods 22. Cable 10 may also include a reinforcement sheet or layer, shown as armor layer 30, that is located outside of water barrier 28. Armor layer 30 is wrapped around the interior elements (including optical fibers 18) of cable 10 such that armor layer 30 surrounds optical fibers 18 within bore 16. Armor layer 30 generally provides an additional layer of protection to fibers 18 within cable 10, and may provide resistance against damage (e.g., damage caused by contact or compression during installation, damage from the elements, damage from rodents, etc.).

In various embodiments, armor layer 30 may be formed from a variety of strengthening or damage resistant materials. In the embodiment shown in FIG. 1, armor layer 30 is formed from a corrugated sheet of metal material having an alternating series of ridges and troughs. In one embodiment, the corrugated metal is steel, and in another embodiment, the corrugated metal is aluminum. In other embodiments, other non-metallic strengthening materials may be used. In some embodiments, armor layer 30 may be formed from plastic materials having a modulus of elasticity over 2 GPa, and more specifically over 2.7 GPa. Such plastic armor layers may be used to resist animal gnawing and may include animal/pest repellant materials (e.g., a bitter material, a pepper material, synthetic tiger urine, etc.).

In various embodiments, cable jacket 12 may include one or more discontinuity, such as co-extruded discontinuities 32, embedded in cable jacket 12. In general, discontinuities 32 provide a weakened area in jacket 12 that allows the user to peel open jacket 12 in order to access core 26.

Referring to FIGS. 1 and 2, cable 10 includes a plurality of bonded sections, shown as welds 34, that bond the outer surfaces of each of the core elements to the outer surfaces of the adjacent core elements of optical core 26. In general, welds 34 are discrete bonded sections which are separated from each other by unbonded sections, shown as unbonded sections 36, along the interfaces between outer surfaces of adjacent buffer tubes 20 and/or filler rods 22.

As shown in FIG. 2, buffer tubes 20 and/or filler rods 22 of optical core 26 may be wrapped relative to each other around a central area 38. In various embodiments, buffer tubes and/or filler rods 22 may be wrapped relative to each other in various patterns, including helical patterns, spiral patterns, SZ patterns, etc. Welds 34 bind adjacent core elements of optical core 26 together such that the wound pattern is held in place by welds 34 via adhesion (where an interfacial material is used) or cohesion (where a bond is created between the material of the tubes). Thus in such embodiments, welds 34 resist normal and tangential movement of tubes surfaces relative to each other and thus, act to restrain the tendency of the core elements to unravel from the wrapped pattern. In some such embodiments, because of the adhesion provided by welds 34, cable 10 does not include an external radial binding element, such helically wrapped binder yarns or binder sleeve, that provide a radially inward force to hold together optical core 26 in the desired pattern. In addition, in some embodiments, central area 38 does not include a rigid support element, such as strength member 24, because welds 34 hold optical core 26 in the desired wrapped pattern during manufacturing without the need for a rigid central member.

As shown in the embodiment of FIG. 2, optical core 26 comprises multiple core elements (six core elements in the specific embodiment of FIG. 2) that are wrapped in pattern relative to each other such that central area 38 is surrounded in the circumferential direction by buffer tubes 20 and filler rods 22 when viewed in a plane perpendicular to core longitudinal axis 40 (i.e., an end-plan view in the orientation of FIG. 2). In this arrangement, each core element (e.g., buffer tube 20 or filler rod 22) is adjacent to two other core elements in the circumferential direction; one adjacent in the clockwise direction and one adjacent in the counterclockwise direction. In such embodiments, optical core 26 includes a plurality of welds 34 between the outer surface of each core element and the outer surface of its clockwise adjacent neighbor and a plurality of welds 34 between the outer surface of each core element and the outer surface of its counterclockwise adjacent neighbor.

By way of example referring to FIG. 2, one of buffer tubes 20, labeled as buffer tube 42, is adjacent a clockwise neighboring buffer tube 44 and is also adjacent a counterclockwise neighboring buffer tube 46. Specific buffer tube 42 is bonded to clockwise neighboring buffer tube 44 by a series of welds 48 located between the outer surfaces of these two buffer tubes. Similarly, specific buffer tube 42 is bonded to counterclockwise neighboring buffer tube 46 by a series of welds 50 located between the outer surfaces of these two buffer tubes. Like the rest of optical core 26, an unbonded section 36 is located between each weld along the interfaces between the buffer tubes.

In various embodiments, welds 34 can be any type of suitably strong bond or joint that can be formed intermittently along the length of optical core 26. In various embodiments, welds 34 may be laser welds formed by melting together sections of adjacent core elements with laser energy. In other embodiments, welds 34 may be ultrasonic welds formed by melting together sections of adjacent core elements with ultrasonic energy. In other embodiments, welds 34 may be formed from an adhesive agent that is located between adjacent core elements. In various embodiments, the adhesive may be a glue, a heat curable adhesive, a hot-melt adhesive (e.g., a thermoplastic adhesive), a radiation curable adhesive, etc.

Referring to FIG. 2, optical core 26 is shown having at least one spiral wrapped section. Specifically, optical core 26 is shown in an alternating helical pattern (also referred to as an SZ stranding pattern). In such embodiments, optical core 26 includes a right-handed spirally wrapped section 60, a reversal section 62 and a left-handed spirally section 64. Within right-handed spirally wrapped section 60, the core elements, such as buffer tubes 20 and filler rods 22, are wrapped spirally in the right-handed direction. Within left-handed spirally wrapped section 64, the core elements, such as buffer tubes 20 and filler rods 22, are wrapped spirally in the left-handed direction. Reversal section 62 is a section that provides the transition between the right-handed spirally wrapped section 60 and the left-handed spirally wrapped section 64. In one embodiment, reversal section 62 is shaped as a sinusoidal function.

It should be understood that while FIG. 2 only shows several right-handed spirally wrapped sections, several reversal sections and several left-handed spirally wrapped sections, optical core 26 may include a large number of repeating sections similar to the sections shown in FIG. 2 extending the length of cable 10. In various embodiments, the right-handed spirally wrapped sections and left-handed spirally wrapped sections alternate along the length of optical core 26 with reversal sections located between each oppositely wrapped spiral section.

In addition, spirally wrapped sections include a pitch length (also known as lay length) which is the axial distance required for one of the core elements to complete a full revolution around central area 38. In some embodiments, core 26 may have an average pitch length (or average lay length) which is the average of the multiple individual pitch lengths along the length of core 26. In various embodiments, the number of welds 34 between adjacent core elements may be based on the lay length of optical core 26. In general, the shorter the lay length is, the closer together adjacent welds 34 are formed in order to hold together the more tightly wrapped pattern. In various embodiments, the spacing between welds 34 is a function of a variety of factors including the number of core elements, lay length, diameter of core elements, etc.

In the embodiment shown in FIG. 2, welds 34 form a pattern of spaced apart welds 34 that are aligned longitudinally with each other such that a path or stripe of welds 34 is defined that extend in the longitudinal direction generally parallel to longitudinal axis 40. As shown in FIG. 2, the one of the path of welds 34 is labeled with the line 66. In various embodiments, as explained in more detail below, the substantially aligned nature of the weld stripes 66 results from the weld formation system that is positionally fixed relative to the wrapped core elements, and the wrapped core elements are advanced through the weld system during weld formation. As will be understood, the number of weld stripes 66 is equal to the number of core elements of optical core 26, and in the embodiment shown, optical core 26 includes six weld stripes 66 that are evenly spaced around the perimeter of optical core 26.

Figure 3:
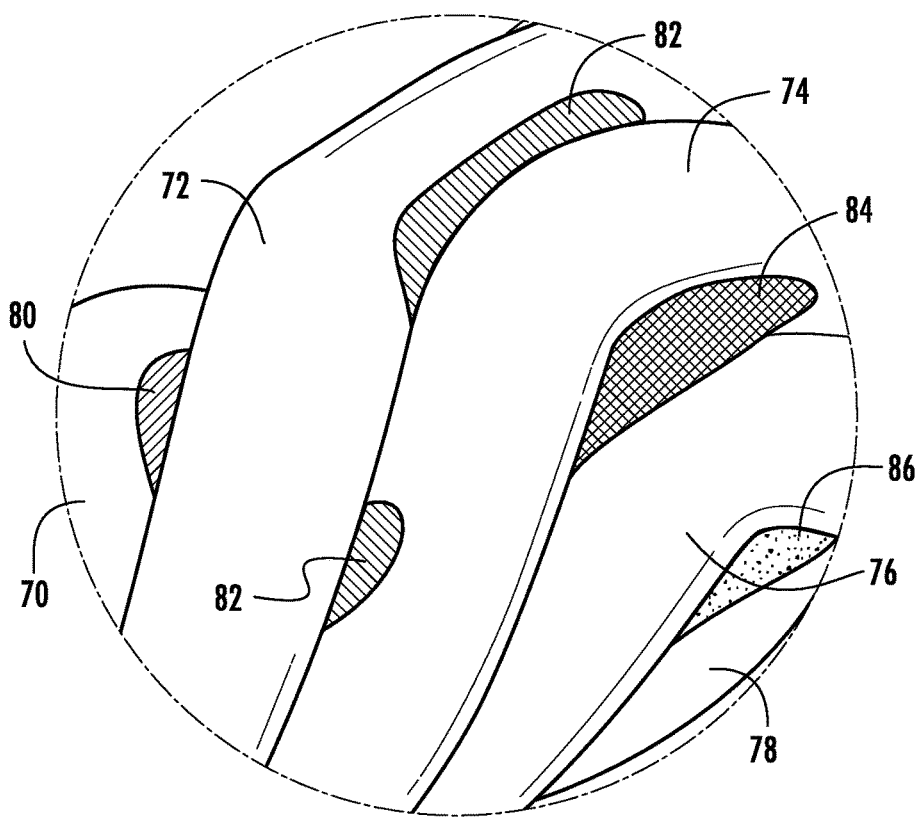
FIG. 3 is a detailed view showing bonding between adjacent core elements of the optical core of FIG. 2 according to an exemplary embodiment.

Referring to FIG. 3, a detailed view of a section of optical core 26 is shown according to an exemplary embodiment. In general, FIG. 3 illustrates a color ID system in which uniquely colored welds 34 are used to uniquely identify each core element of optical core 26. In general, each core element of optical core 26 includes welds of a first unique color on one side of the core element (e.g., on the counterclockwise side at a given axial position) and welds of a second unique color on the other side of the core element (e.g., on the clockwise side at a given axial position). In this arrangement, each core element of optical core 26 is identified by a unique color pair. In such embodiments, by using unique weld colors, rather than uniquely colored or labeled buffer tubes, a single stock of commonly colored buffer tube may be used during cable formation, with the positional labeling being added during cable construction as the welds are formed.

As an example, referring to FIG. 3, the five core elements shown in FIG. 3 are labeled with unique reference numerals labeled in the clockwise direction: core elements 70, 72, 74, 76 and 78. As shown in FIG. 3, weld 80 between core elements 70 and 72 has a first distinct color, color A, and welds 82 between core elements 72 and 74 have a second distinct color, color B. Thus, core element 72 is identified as the only core element having weld spots of both color A and color B. Similarly, weld 84 between core elements 74 and 76 has a third distinct color, color C. Thus, core element 74 is identified as the only core element having weld spots of both color B and color C. Similarly, weld 86 between core elements 76 and 78 has a fourth distinct color, color D. Thus, core element 76 is identified as the only core element having weld spots of both color C and color D. In FIG. 3, welds 80, 82, 84 and 86 are shown with different crosshatching to represent the different colors of each weld material. This pattern continues around optical core 26 such that there are six unique color pairs uniquely identifying each core element of optical core 26. Further after tube separation, the uniquely colored welds fracture, leaving two unique color combinations on the surface of each core element to allow for identification. For example, following separation of core element 72 from the other core elements, a section of weld 80, having color A, and a section of weld 82, having color B, remains on core element 72, thus providing the color ID function even after separation.

In various embodiments, the coloring of welds, such as welds 80, 82, 84 and 86, shown in FIG. 3, may be provided by the positioning of a colored weld precursor material (e.g., a colored curable adhesive material, a colored laser weld filament, etc.) at the interface of each adjacent core element. In such embodiment, the colored weld precursor material is cured or otherwise activated to form the weld, bonding the adjacent core elements while maintaining a coloring that is distinct from the color of the core elements and from the other welds.

Figure 4:
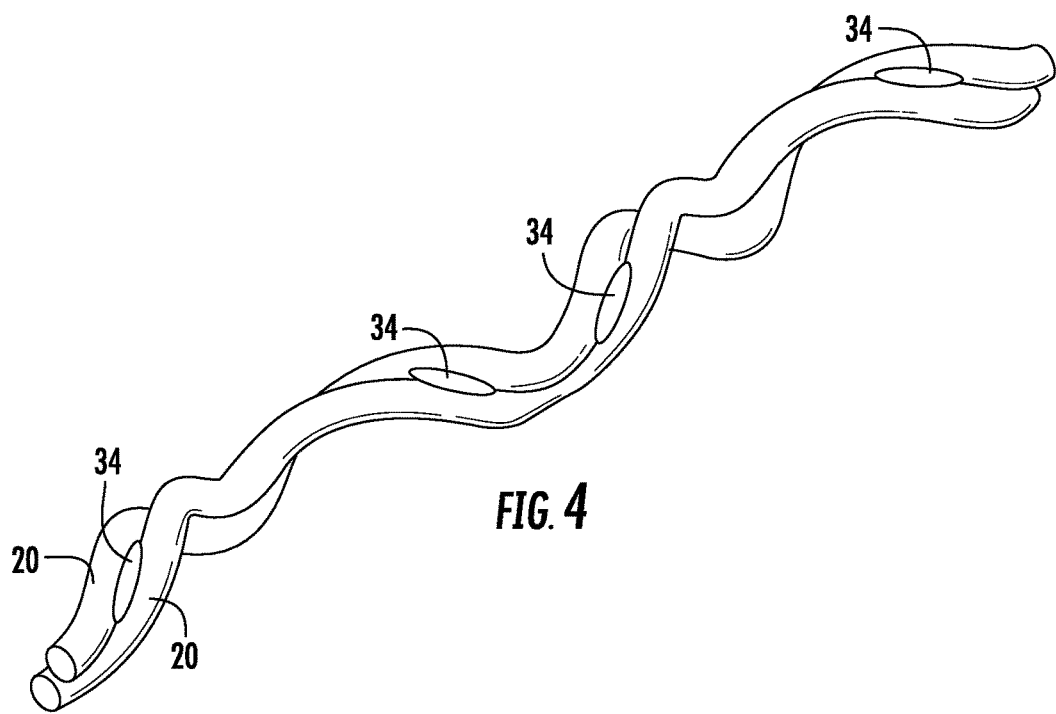
FIG. 4 shows two bonded core elements maintaining a self-supported SZ stranding pattern according to an exemplary embodiment.

Referring to FIG. 4, two wrapped and welded buffer tubes 20 are shown welded together by welds 34. As shown in FIG. 4, Applicants have found that welds 34 join a pair of buffer tubes 20 together in a manner that forms a stable structure that maintains the SZ wrapped pattern without external binders and without the need for a central rigid support member. Specifically, Applicants have found that two buffer tubes 20 having spaced discrete welds 34 which provide only torsional constraint allows the tube pair to maintain the SZ wrapped pattern. Thus, Applicants have determined that the SZ pattern can be maintained within an optical core having only the torsional constraint provided by welds 34, which allows for SZ stranded optical cores to be formed without the need for central strength members and/or exterior radial binders to maintain the SZ stranded pattern. Although it should be noted that while certain embodiments discussed herein do not need these elements to maintain the SZ stranding, in some embodiments, cable 10 may include a central strength member and/or external binder for other purposes, such as tensile strength, improved crush resistance, etc.

Figure 5:
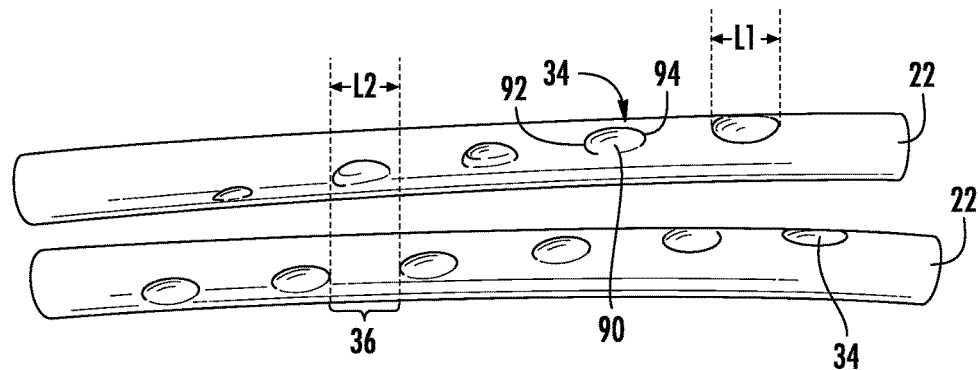
FIG. 5 shows sections of two previously bonded core elements after separation according to an exemplary embodiment.

Referring to FIG. 5, two buffer tubes 20 are shown following separation of welds 34. As shown in FIG. 5, in one embodiment, when two adjacent buffer tubes 20 are separated, welds 34 break or separate leaving a mark or protrusion on the surface of each tube at the location of the weld. In one embodiment, the height of the protrusion or depression left by weld 34 following separation is less than 150 micrometers and more specifically is about 100 micrometers.

In various embodiments, welds 34 are sized and formed to be strong enough to maintain optical core 26 in the wrapped pattern (as shown in FIG. 2) while also allowing for relatively easy, manual separation. In various embodiments, the number of welds per unit length of core element, the length of each weld, and/or the bond gradient within each weld is selected to provide this balance between strength and easy manual access. In various embodiments, between one and five welds are formed per 25 mm of core element length. In various embodiments, each weld 34 has a length in the longitudinal direction, shown as L1. In various embodiments, L1 is less than 5 mm and more specifically is about 2 mm (e.g., 2 mm plus or minus 50%). In various embodiments, each unbonded section 36 has a length in the longitudinal direction, shown as L2. In various embodiments, L2 is less than 25 mm, specifically is between 1 mm and 10 mm, and more specifically is about 4 mm (e.g., 4 mm plus or minus 50%). In various embodiments, L2 is a function of the tube laylength, and the number of welding tools (e.g., lasers) used to create welds 34. In a specific embodiment, L2 will be equal to the laylength divided by the number of laser sources placed around the core and then divided by the cosine of the helical angle.

As shown in FIG. 5, welds 34 may be formed to have a generally elliptical shape. In one such embodiment, the elliptical shape results in a weld 34 having a bond strength that varies along the length of the weld. In specific embodiments, bond strength at the center 90 of weld 34 is greater than at either end points 92 and 94. In a specific embodiment, the bond strength within weld 34 is at a maximum in the central region of weld 34 and decreases gradually to minimums at end points 92 and 94. In one embodiment, the bond strength of weld 34 is 10% at ends 92 and 94, and 80% at center 90. It is believed that the bond strength gradient of welds 34 facilitate tube separation by reducing the likelihood of kinking the tubes during separation. In various embodiments, this localized bond strength (measured as a force only) is in relation to the maximum breaking force as measured during a T-peel type test. As this measurement progresses it will plot the measured force as a function of tube displacement (which relates to the amount of fracture). At the ends of weld 34, the force is <10% of maximum separation force, and the maximum separation force of weld 34 is in the middle of the weld.

In various embodiments, the weld arrangement and structure discussed herein provides welds that allow tubes 20 to be separated by hand. In one embodiment, welds 34 join together tubes 20 such that the force needed to break welds 34 and to separate tubes 20 from each other is between 0.5 Newtons (N) and 1.0 N using a T-peel test. In a specific embodiment, the T-peel test is conducted in accordance with ASTM D1876 standard or a modification thereof.

In another embodiment, welds 34 bind optical core 26 together such that the strength member pullout force is greater than 1 N/10 mm of length of optical core 26. This resistance to removing the central strength member out of the core is an indication of the amount of coupling force between strength member and the core elements surrounding it. This resistance is achieved with the friction created between the tubes and the strength member. In one embodiment, the strength member pullout force is measure with a tensile testing machine (such as a tensile testing machine available from Instron) where the strength member is pulled from the core of the cable sample, and the peak force read during pull-out is normalized to the length of the sample tested, e.g., (N/mm).

Figure 6:
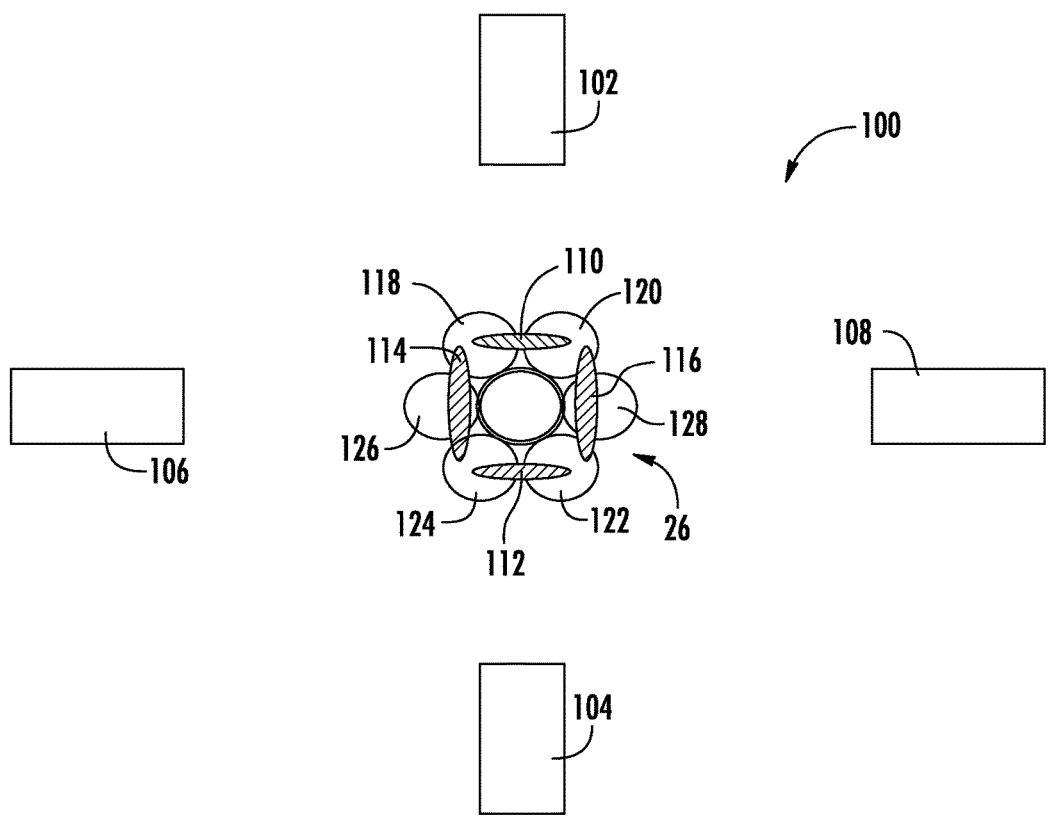
FIG. 6 is a schematic view of a laser welding system for bonding core elements according to an exemplary embodiment.

Referring to FIGS. 6-9, various weld formation systems are shown according to exemplary embodiments. Referring to FIG. 6, a schematic end view of a laser weld system 100 is shown according to an exemplary embodiment. Laser weld system 100 includes a plurality of lasers 102, 104, 106 and 108 spaced around optical core 26. In general, optical core 26 is advanced through laser weld system 100 in the direction perpendicular to the viewing plane of FIG. 6 following formation of the SZ stranding pattern.

Lasers 102 and 104 have focal regions 110 and 112, respectively, and lasers 106 and 108 have focal regions 114 and 116, respectively. As shown the lasers of laser weld system 100 are focused such that the laser focal planes of each laser reside at the position at which the outer surfaces of adjacent core elements contacting each other. Thus, in this arrangement, laser 102 generates sufficient heat at focal region 110 to form a weld between core elements 118 and 120, and laser 104 generates sufficient heat at focal region 112 to form a weld between core elements 122 and 124. In contrast, because the focal regions 114 and 116 of lasers 106 and 108 are beneath the surface of core elements 126 and 128, no weld is formed by lasers 106 and 108 at the position of optical core 26 shown in FIG. 6. However, as the spiral, SZ pattern of optical core 26 advances through laser weld system 100, abutting outer surfaces of the core elements move into and out of focal region 110, 112, 114 and 116 forming the intermittent and discrete weld pattern shown in FIG. 2. Thus, in this arrangement laser weld system 100 continuously forms intermittent welds 34 as optical core 26 advances through laser weld system 100. In such embodiments, the arrangement in FIG. 6 forms the intermittent welds 34 without requiring turning of lasers on and off and without the need to track the interface between adjacent core elements in order to ensure the welds are formed at the correct location. In addition, laser weld system 100 provides an efficient, continuous system without the need for moving spinning equipment (typical with helically wound binders) to bind optical core 26 in the desired wrapped pattern.

Figure 7:
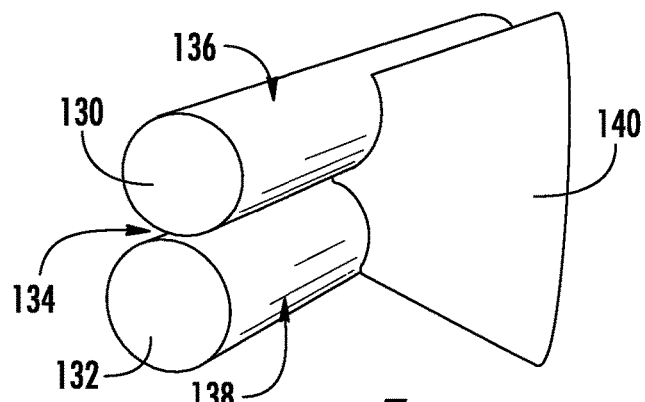
FIG. 7 is a schematic view of a laser welding system for bonding core elements according to an exemplary embodiment.
Figure 8:
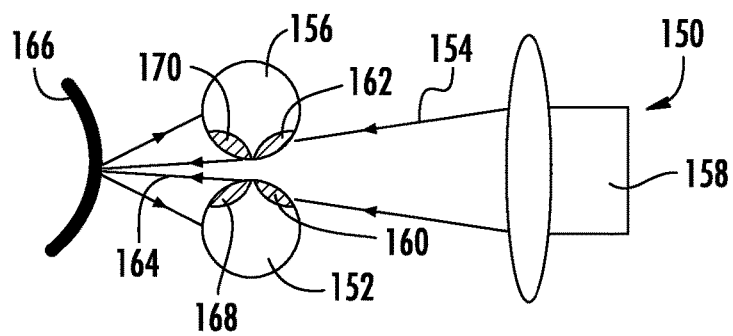
FIG. 8 is a schematic view of a laser welding system for bonding core elements according to another exemplary embodiment.
Figure 9:
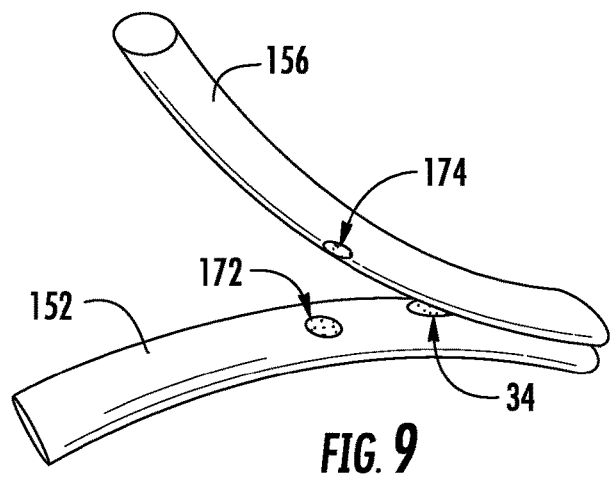
FIG. 9 is a perspective view showing bonding of two core elements following formation of laser welds according to an exemplary embodiment.

Referring to FIGS. 7-9, various laser welding configurations and processes are shown according to exemplary embodiments. In various embodiments, the laser beam of the laser weld system is configured to always focus on the right location between adjacent core elements in order to heat up the two core elements and to create a melt area on each core element. The systems are also configured to force the melt area on core elements together to form a joint or bonded section, such as weld 34 discussed above. In various embodiments, laser welding can be achieved through one step or multiple step processes.

Referring to FIG. 7, an exemplary embodiment of a one-step laser weld process is shown. As shown in FIG. 7, two core elements 130 and 132 are forced together such that an interface 134 between opposing sections of their outer surfaces 136 and 138 is formed before being exposed to laser beam 140. Once exposed to laser beam 140, a laser weld is formed at the portion of the interface that is heated by laser beam 140. In one embodiment, laser beam 140 is an elliptical laser beam. In one such embodiment, a conventional circular laser beam is reshaped into an elliptical beam so that it can cover a relatively large area and create adequate melt area to form the weld. In various embodiments, the aspect ratio of the elliptical beam ranges from 2 to 10 so that the process is insensitive to tube drifting and vibration because laser beam 140 is large enough to form the weld at interface 134 despite the drift and/or vibration.

Referring to FIGS. 8 and 9, a multiple-step laser weld process is shown. Referring to FIGS. 8 and 9, laser weld system 150 generates a laser beam 154, and two separated core elements 152 and 156 are exposed to laser beam 154. In the embodiment shown in FIG. 8, laser weld system 150 is configured such that melt areas are formed on sections of the outer surfaces of core elements 152 and 156 that both face laser 158, and that are on the opposite side from laser 158. Specifically, as shown in FIG. 8, laser beam 154 is a relatively large laser beam such that laser beam 154 heats up portions 160 and 162 of core elements 152 and 156 that face laser 158. In addition, a portion 164 of laser beam 154 passes through the gap between core elements 152 and 156 to be reflected by a mirror 166 toward the sides of core elements 152 and 156 that are opposite from laser 158. In this manner, regions 168 and 170 of core elements 152 and 156 are heated by laser beam 154. As a result, core elements 152 and 156 are heated up from both sides relative to laser 158 to form a relatively large melt area to form a laser weld between core elements 152 and 156.

In various embodiments, laser beam 154 may be either circular or elliptical with a beam size in the vertical direction (in the orientation of FIGS. 8 and 9) that is larger than the gap between core elements 152 and 156. Mirror 166 is configured to reshape/split the beam and redirect them onto regions 168 and 170 of the outer surfaces of core elements 152 and 156. This configuration can tolerate a large amount of drifting of the both core elements 152 and 156. As shown in FIG. 9, once melt area 172 is formed in regions 160 and 168 of core element 152, and the opposing melt area 174 is formed at regions 162 and 170 of core element 156, the two core elements are brought together to form a weld 34.

There are many different alternatives to arrange the laser beam so that it can heat up the outer surface of the core elements to form a joint or weld, such as weld 34. In this embodiment, the two melt regions are similar in size and location. Since the laser beams are synchronized to the core element motion through a vision system or other kind of feedback control system, there is no need to form a large melt region on each core element. This arrangement may mitigate protrusion on the surface of the core elements at the weld site. In this configuration, the laser beam incident angle to the core elements ranges from 10 to 45 degrees. In other embodiments, the beam may move with the core elements at the same or slightly different speeds. Doing so can increase interaction time between the laser and core element so that lower laser power is needed to create the desired melt region. In addition, forming a melt region by using a lower laser power with increased laser interaction time can decrease the chance of damaging the core element. In various embodiments, the relationship between the laser beam and the melt region is controlled so that the welding patterns are consistent between all core elements in the welded optical core.

In various embodiments, a method of forming a core for an optical communication cable is provided. The method includes providing a plurality of elongate optical core elements (e.g., buffer tubes 20, filler rods 22, core elements 152 and 156, etc.) that each have an outer surface. The method includes wrapping the plurality of elongate optical core elements around each other such that a portion of a length of the plurality of wrapped elongate core elements forms a spiral portion, and the plurality of core elements surrounds a central area in the circumferential direction when viewed in cross-section. In this wrapped arrangement, an outer surface of each core element is adjacent to the outer surface of one of the other core elements in the clockwise direction and is also adjacent to the outer surface of one of the other core elements in the counterclockwise direction. The method includes bonding a subsection of the outer surface of a first core element to a subsection of the outer surface of the adjacent core element in the clockwise direction. The method also includes bonding another subsection of the outer surface of the first core element to a subsection of the outer surface of the adjacent core element in the counterclockwise direction. In various embodiments, the bonded subsections are welds, such as welds 34 discussed above. In various embodiments, the bonding involves laser welding, such as by the laser welding systems shown and described above in relation to FIGS. 6-9.

In various embodiments of the method, the wrapping step forms an SZ wrapped pattern. In some such embodiments, the wrapped pattern includes a plurality of left-handed spirally wrapped sections, a plurality of right-handed spirally wrapped sections and a plurality of reversal sections providing transitions between the left-handed spirally wrapped sections and the right-handed spirally wrapped sections. In specific embodiments, the bonded subsections maintain the core elements in the wrapped pattern without an external binding element applying a radially inward force. In various embodiments of the method, the bonding steps utilize at least one of a laser welding, ultrasonic welding and using an adhesive material. In various embodiments of the method, the bonding steps form bonds spaced from each other by unbonded sections of core elements having lengths between 1 mm and 10 mm. In a specific embodiment of the method, the bonding step is laser welding step utilizing a laser beam focused to melt regions at the interface of the outer surfaces of adjacent core elements to form a laser weld.

As noted above, in a specific embodiment, cable jacket 12 is formed from a polyethylene material. In various embodiments, cable jacket 12 may be a variety of materials used in cable manufacturing, such as medium density polyethylene, low smoke, zero halogen polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc. In various embodiments, the buffer tubes of optical fiber units may be formed from an extruded thermoplastic material extruded to surround fibers 18. In one embodiment, core elements, including buffer tubes, are formed from a polypropylene material. In another embodiment, core elements, including buffer tubes, are formed from a polycarbonate material. In various embodiments, core elements, including buffer tubes, are formed from one or more polymer material including polybutylene terephthalate (PBT), polyamide (PA), polyoxymethylene (POM), polyvinylchloride (PVC), flame retardant PCV, poly (ethene-co-tetrafluoroethene) (ETFE), combination of the polymer materials discussed herein, etc. In various embodiments, the material of core elements, including buffer tubes, may include various fillers or additives including UV blocking materials and burn resistant materials.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical communication cable comprising:
    a cable body including an inner surface defining a passage in the body;

a first core element located in the cable body, the first core element comprising:
    a first buffer tube having an inner surface defining a bore and an outer surface; and
    a first plurality of optical fibers located within the bore of the first buffer tube;
a second core element located in the cable body, the second core element comprising:
    a second buffer tube having an inner surface defining a bore and an outer surface; and
    a second plurality of optical fibers located within the bore of the second buffer tube;
    wherein the first core element and the second core element are wound in an SZ wrapped pattern around a central area of the passage such that the first and second core elements are adjacent to each other defining an interface between the outer surfaces of the first and second tubes, wherein the interface extends at least a portion of a length of the cable body; and
a plurality of discrete bonded sections joining the outer surface of the first buffer tube to the outer surface of the second buffer tube at discrete sections along the length of the interface, wherein the plurality of discrete bonded sections hold the first buffer tube and the second buffer tube relative to each other in the SZ wrapped pattern following winding, wherein unbonded sections of the outer surface of the first buffer tube and of the outer surface of the second buffer tube are located between adjacent bonded sections along the length of the interface.

2. The optical communication cable of claim 1, wherein the plurality of discrete bonded sections resist normal and tangential movement between the first and second buffer tubes.

3. The optical communication cable of claim 1, where each of the plurality of discrete bonded sections includes a center point located between first and second ends in a longitudinal direction of the interface, wherein a bond strength of each of the discrete bonded sections is greater at the center point than at the first and second ends.

4. The optical communication cable of claim 1, wherein the plurality of discrete bonded sections comprises one to five discrete bonded sections every 25 mm of longitudinal length of the first and second buffer tube, wherein the length of each bond in the longitudinal direction of the first and second buffer tubes is less than 5 mm.

5. The optical communication cable of claim 1, wherein the plurality of discrete bonded sections joins the first buffer tube to the second buffer tube such that between 0.5 Newtons and 1.0 Newtons is required to break the bonded sections separating the first buffer tube from the second buffer tube under a T-peel test.

6. The optical communication cable of claim 1, wherein the discrete bonded sections maintain the first and second buffer tubes in the wrapped pattern without an external binding element applying an radially inward force.

7. The optical communication cable of claim 6, wherein a central strength member is located in the central area of the passage, wherein the plurality of discrete bonded sections hold the first buffer tube and the second buffer tube relative to each other in the SZ wrapped pattern around the central strength member.

8. The optical communication cable of claim 1, wherein the bonded sections are at least one of:
    a laser weld fusing the outer surface of the first buffer tube to the outer surface of the second buffer tube;
    an ultrasonic weld fusing the outer surface of the first buffer tube to the outer surface of the second buffer tube; and
    an adhesive material located between and bonded to both the outer surface of the first buffer tube and to the outer surface of the second buffer tube.

9. The optical communication cable of claim 8, wherein the bonded sections are formed from a material that has a color different from a color of the first buffer tube and from a color of the second buffer tube.

* * * * *

UNITED STATES PATENT AND TRADEMARK OFFICE
CERTIFICATE OF CORRECTION

Page 1 of 1

PATENT NO. : 9,977,207 B2
APPLICATION NO. : 15/168545
DATED : May 22, 2018
INVENTOR(S) : Anne Germaine Bringuier et al.

It is certified that error appears in the above-identified patent and that said Letters Patent is hereby corrected as shown below:

In the Claims

Column 14, Line 18, Claim 6, delete "an" and insert -- a --, therefor.

Signed and Sealed this
Seventeenth Day of March, 2020

Andrei Iancu
*Director of the United States Patent and Trademark Office*